United States Patent [19]
Hobbs

[11] Patent Number: 5,785,004
[45] Date of Patent: Jul. 28, 1998

[54] AUTOMATIC PET ANIMAL SPRAYING SYSTEM

[76] Inventor: Robert L. Hobbs, 14 The Elms, Langford, Lechlade, Glos. GL7 3LB, United Kingdom

[21] Appl. No.: 799,964

[22] Filed: Feb. 14, 1997

[51] Int. Cl.[6] .................................... A61D 7/00
[52] U.S. Cl. .................................... 119/651
[58] Field of Search .................. 119/650, 651, 119/652, 656, 665, 666, 667, 669

[56] References Cited

U.S. PATENT DOCUMENTS

| | | | |
|---|---|---|---|
| 1,604,303 | 10/1926 | Peck et al. | 119/667 |
| 2,900,957 | 8/1959 | Peterson | 119/667 |
| 4,334,504 | 6/1982 | Matthews | 119/159 |
| 4,567,856 | 2/1986 | Sorensen | 119/159 |
| 4,580,529 | 4/1986 | Wilson | 119/651 |
| 4,987,861 | 1/1991 | Plastiques | 119/159 |
| 5,056,467 | 10/1991 | Schaefer | 119/159 |
| 5,063,880 | 11/1991 | Bouthillier | 119/159 |

*Primary Examiner*—Thomas Price
*Attorney, Agent, or Firm*—Our Pal(R) Asija

[57] ABSTRACT

This invention relates to the art and science of spraying pet animals with pesticides automatically as a pet animal passes through an access device of this invention. An embodiment of this invention comprises a reservoir of pesticide connected to an animal access device such as a cat flap via a plurality of conduits and spray nozzles located on the aperture of the access device. The system incorporates a battery powered pump and a timer to control the quantity and the times during which the pesticide will be dispensed upon detecting the presence of a pet.

18 Claims, 3 Drawing Sheets

AUTOMATIC PET ANIMAL SPRAYING SYSTEM

The invention relates to animal access devices of the kind comprising a fixed frame structure defining an access aperture, and a displaceable cover mounted on the frame structure for movement between a closed position where it extends across the aperture and an open position where the aperture is at least partly open to allow an animal to pass through it.

Access devices of this kind are often mounted in a door to a dwelling so as to allow a domestic pet to enter or leave the dwelling through the access device while the door is closed. Such device is then commonly referred to as a "cat flap". Although the device of the present invention is particularly suitable for use in this manner, it is not limited to such use but may be applied to any situation where an access device is required to allow an animal of any kind to pass from one location to another.

The invention will be particularly described in relation to a cat flap of the kind where the displaceable cover may be opened by the animal itself, simply by pushing the displaceable cover to the open position. However the invention is also applicable to cat flaps of the kind which are designed so that they can only be opened by a specific animal. For example, in one well known form of device the cover is secured by a magnetically controlled latch which is automatically disengaged by a magnetic collar worn by the cat or other animal.

It is well known that cats and other domestic pets can readily pick up fleas, ticks, mites and other parasites which, if unchecked, can spread to other animals and humans. The most satisfactory way of dealing with such parasites, and prevent their proliferation within the house or other premises where the animal is normally kept, is to treat the animal at regular intervals with a suitable pesticide. However, this can be inconvenient and difficult since in order to apply the pesticide the animal must be caught and then restrained while the pesticide is applied in a controlled manner. The present invention provides a novel form of animal access device, such as a cat flap, where a controlled dose of pesticide or other treatment material may be automatically applied to an animal as it passes through the device.

According to the invention, therefore, there is provided an animal access device comprising a fixed frame structure defining an access aperture, a displaceable cover pivotally mounted on the frame structure so as to extend across and cover the aperture when in a closed position, the cover being pivotable from the closed position to respective open positions on opposite sides of the fixed structure, the cover being movable to one of said open positions in response to pressure on the cover from either side thereof so that an animal may pass in either direction through the aperture, a dispensing device located adjacent the frame structure for applying a flowable material to the body of an animal passing through the aperture, and control means for activating the dispensing device in response to the passage of an animal through the aperture.

The dispensing device may include an applicator for applying the flowable material to the body of an animal passing through the aperture, and supply means for delivering flowable material to the applicator under the control of said control means.

For example, the applicator may comprise at least one spray nozzle located adjacent the periphery of the aperture and directed inwardly thereof, said supply means being adapted to supply said flowable material under pressure to said nozzle.

There may be provided two or more applicators at different spaced locations around the periphery of the aperture, said applicators being connected to a common supply of flowable material.

The aforesaid supply means may comprise a reservoir for said flowable material, said control means controlling the flow of flowable material from the reservoir to the applicator. In this case the control means may include a pump for delivering flowable material from the reservoir to the applicator. The control means may also include a valve, such as a non-return valve.

The reservoir preferably includes an indicator to indicate the level of flowable material in the reservoir.

Said supply means may comprise a source of flowable material under pressure, and the control means may then comprise a control valve between said source and the applicator, which valve is opened in response to the passage of an animal through the aperture.

In any of the above arrangements the dispensing device may be electrically operated and the control means may include an electric operating switch which is operated by passage of an animal through the aperture.

The electric operating switch may be part of a circuit which also includes a main electric switch, the operating switch only being effective to actuate the dispensing means when said main switch has also been operated.

The circuit may include a time-controlled switching device, the operating switch only being effective to actuate the dispensing means when said time-controlled switching device has also been operated.

In any of the above arrangements said control means may include a switch device which is operated by movement of said displaceable cover from the closed position towards the open position. Preferably the switch device is operated by movement of the displaceable cover in only one direction from the closed position. In the case where the dispensing device is electrically operated, said switch device may comprise an electric switch which is operated by movement of the displaceable cover from the closed position towards the open position, closure of said switch activating the dispensing device.

The invention includes within its scope a flowable material dispensing system, for use in an animal access device of any of the kinds referred to above, and comprising a reservoir for flowable material, conduit means leading from the reservoir to one or more spray nozzles, an electrically powered pump for delivering flowable material from the reservoir along the conduit means to the nozzle or nozzles, and an electric switch device which is operable to activate the pump.

The dispensing system may also include a battery box whereby batteries located in the box provide electrical power to the pump under the control of the switching device.

The following is a more detailed description of an embodiment of the invention, by way of example, reference being made to the accompanying drawings in which.

Figure 1:
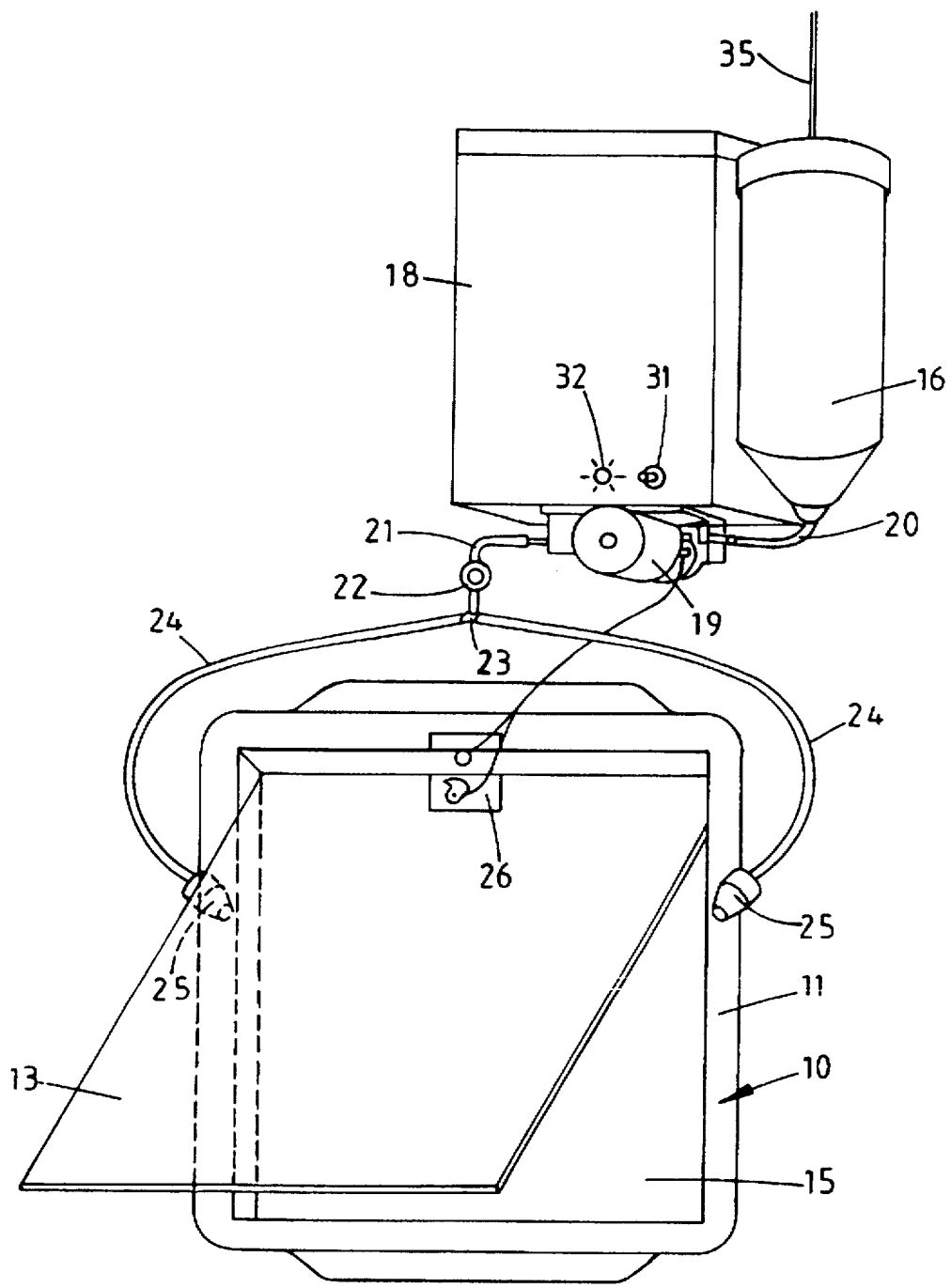
FIG. 1 is a diagrammatic perspective view of one form of access device according to the invention.

Referring to the drawings, the access device, or cat flap, comprises a fixed frame 10 of generally rectangular form which is secured around a rectangular aperture in a door or other form of panel. As is well known, the frame 10 may comprise an inner portion 11 (see FIG. 2) on the inside of the door and an outer portion 12 on the outside of the door. A hinged flap 13 is mounted on the external part 12 of the frame so as to pivot about an upper horizontal access 14. In the closed position, shown in FIG. 2, the flap 13 hangs vertically so as to completely close off the aperture 15 within the frame 10. The flap 13 is designed so that it may swing both inwardly and outwardly so as to permit the passage of a cat or other animal in either direction through the device.

The basic cat flap 10–14 may be any of the many kinds currently available and the detailed design of the cat flap itself does not form part of the present invention. The cat flap itself is therefore only shown diagrammatically.

In accordance with the invention there is associated with the cat flap a dispensing system for applying pesticide or other chemical automatically to a cat or other animal passing through the aperture.

The dispensing system comprises a cylindrical reservoir 16 which is mounted on the inside surface of the door 17 above the frame 10 of the cat flap. The reservoir 16, which may conveniently be formed from plastics material, may be integrally formed on the side of a battery box 18.

Batteries in the battery box 18 provide power to a small electric pump 19 which is mounted on the underside of the battery box and is connected by a plastics inlet conduit 20 to the lower end of the reservoir 16. An outlet conduit 21 from the pump 19 leads, via a non-return valve 22 and a Y-junction 23, to two delivery conduits 24 each of which leads to an applicator nozzle 25 mounted adjacent the side members of the frame part 11 on the inside of the door 17. The nozzles 25, which may be mounted in any convenient manner on the frame 10 or on the door panel itself, are directed downwardly and inwardly towards the aperture 15 within the frame 10.

Figure 2:
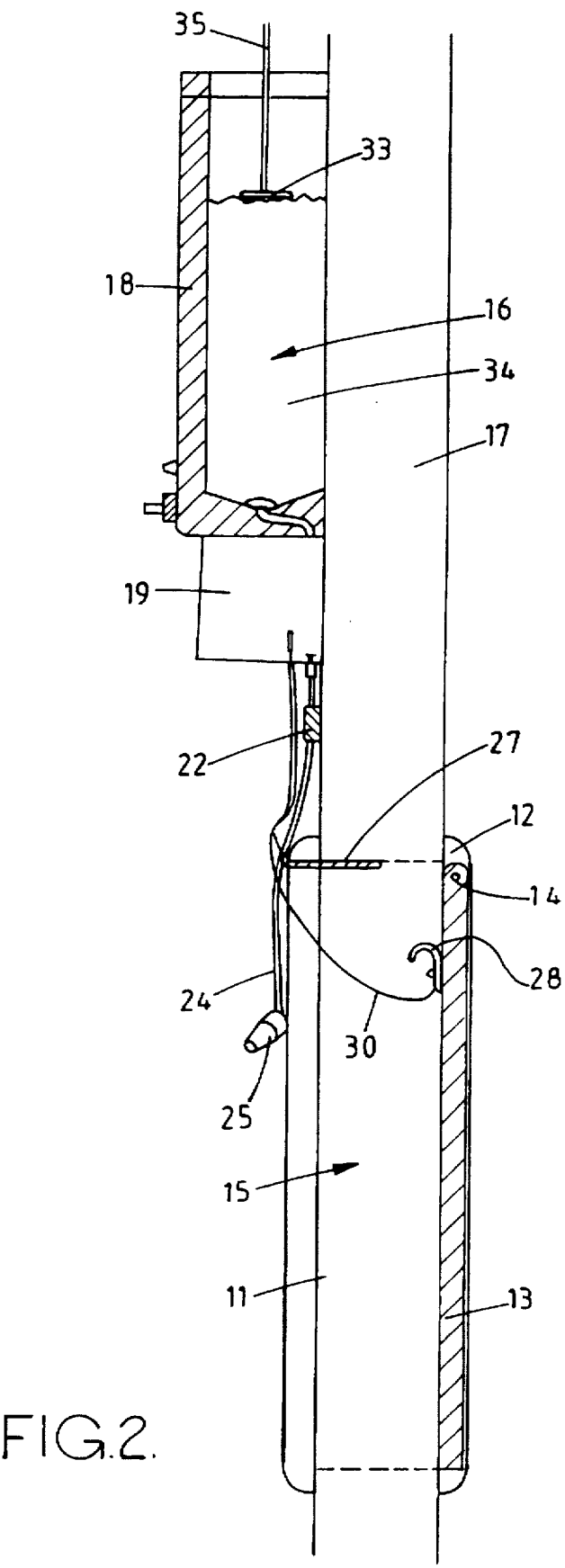
FIG. 2 is a vertical section through the access device, in the closed position.

The pump 19 is controlled by a switch mechanism 26 mounted on the cat flap. As best seen in FIG. 2, the switch mechanism 26 comprises a fixed upper contact 27 mounted on the underside of the upper horizontal member of the frame 10, and a moving contact 28 mounted on the inner side of the hinged flap 13, a short distance below the pivot axis 14.

Figure 3:
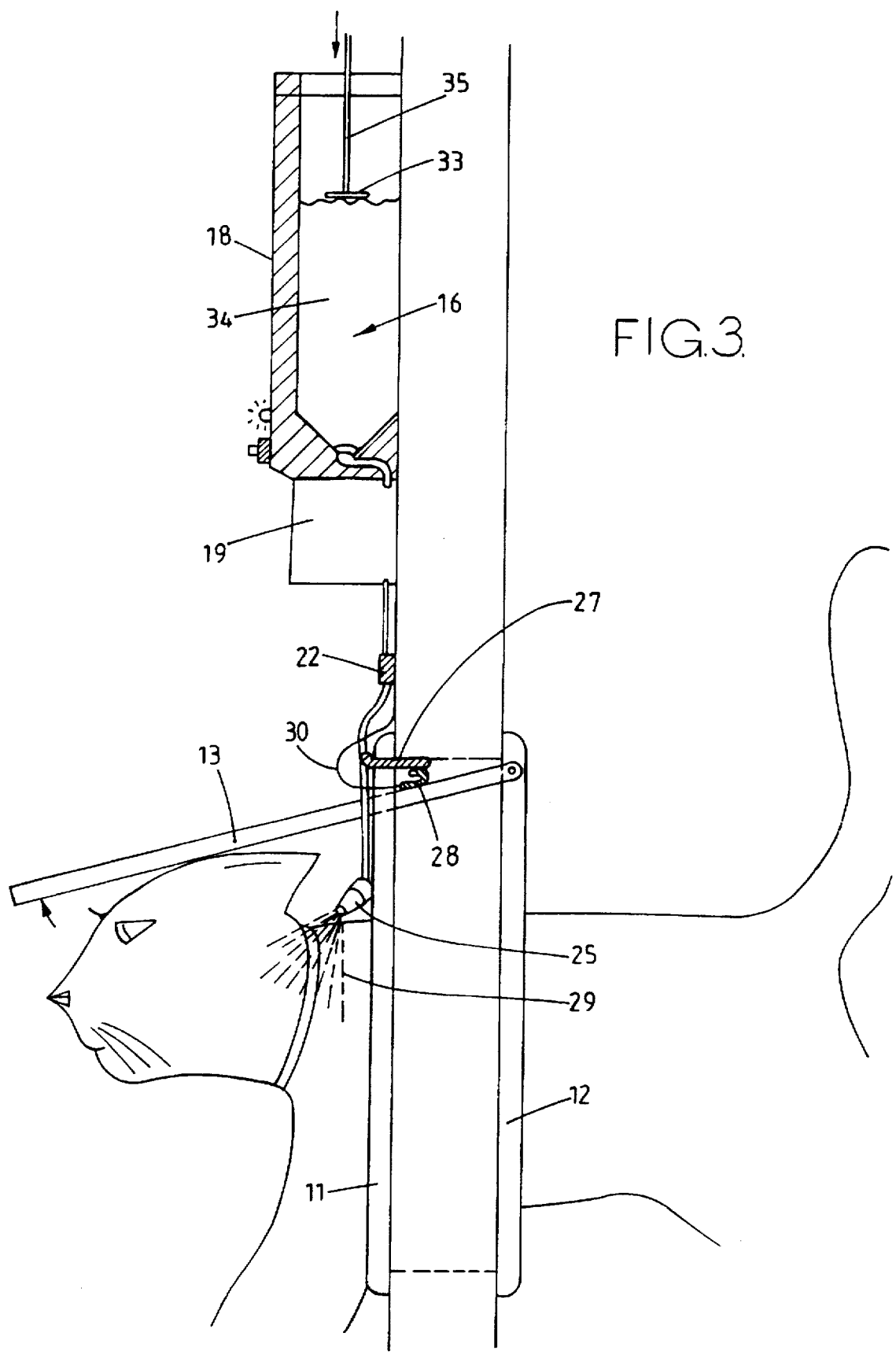
FIG. 3 is a similar view to FIG. 2 showing the device being activated by the passage of an animal through it.

The arrangement is such that, as the hinge flap 13 swings inwardly and upwardly as a cat or other animal passes inwardly through the device (as shown in FIG. 3), the movable contact 28 is swung upwardly to engage the fixed contact 27 and thus complete the electric circuit containing the batteries in the battery box 18 and the pump 19.

The pump 19 is thus activated and pumps pesticide from the reservoir 16 and along the conduits 21,24 to the nozzles 25 which spray the pesticide onto the upper parts and sides of the animal's body, as indicated at 29 in FIG. 3. It is preferable for the sprays of pesticide to be applied only to the upper parts of the animal since application of pesticide to the under parts of a female animal may, for example, cause harm to offspring which may be being suckled.

As soon as the animal has passed completely through the device the flap 13 falls under gravity disengaging the contact 28 from the contact 27 so as to stop the pump 19.

When the anmal goes out through the cat flap, in the opposite direction, the flap 13 is swung outwardly and upwardly, instead of inwardly and upwardly, so that the movable contact 28 does not engage the fixed contact 27. Accordingly, when the animal goes out, the pesticide is not dispensed. The electric flex 30 connecting the movable contact 28 to the pump 19 is sufficiently slack to allow this outward swinging movement of the flap 13.

It may not be desired to apply pesticide to the animal every time it comes in through the cat flap, and in order to permit manual control there is provided on the battery box 18 a main power switch 31 which is in series with the switch 26. Accordingly, closure of the switch 26 is only effective to actuate the pump 19 when the main power switch 31 is also closed. A light 32, such as an LED, is mounted on the battery box 18 and is arranged to be illuminated when the power switch 31 is closed, thus indicating that the device is operative. Thus the owner of the cat can control manually the periods when the animal will be sprayed with pesticide when it passes through the cat flap.

Preferably, however, the electric circuit containing the power switch 31, pump 19 and operating switch 26 also includes pre-settable timing circuitry so that closure of the switch 26 only completes the circuit and activates the pump 19 at specified times. This is to ensure that the animal is not overdosed with pesticide if it passes through the cat flap frequently. For example, the timer may be set so that the device is capable of actuation only for a period of, say, one hour in each twenty four hours, the particular hour being selected to cover a period when it is known that the animal is likely to return to the premises through the cat flap. Suitable timing circuitry is well known and readily available, and will not therefore be described in detail.

In order to provide a visual indication of the quantity of pesticide remaining in the reservoir 16, a float 33 rests on the top surface of the liquid pesticide (see FIG. 3) and is connected to a vertical rod 35 which passes out through an aperture in the lid of the reservoir, so that the length of the rod is which is exposed gives a visual indication of the quantity of pesticide remaining in the reservoir. Alternatively or additionally the reservoir may be formed from transparent plastics material so that the quantity of pesticide within it can be viewed directly.

The above described arrangement is strictly by way of example and it will be appreciated that many modifications may be made to the described arrangement without departing from the scope of the invention.

Instead of the pesticide being pumped from the reservoir by an electric pump, the arrangement may be such that the pesticide flows from the reservoir under gravity, or the reservoir may be pressurised. In either of these cases a pump may not be necessary and all that is required to control the flow of pesticide is a valve in the conduit from the reservoir to the nozzles, which valve is arranged to be opened when the flap 13 is opened. The valve may be electrically or mechanically operated. For example, the pressurised supply of flowable material may comprise a conventional aerosol can, containing pesticide, opening of the cat flap being arraged to operate the dispensing valve of the can through a suitable mechanism.

Although nozzles of the kind shown at 25 are preferred for applying the pesticide as a spray, other forms of applicator may be employed. For example, there may be located so as to overlap the aperture 15 one or more rollers or sponges against which the animal brushes as it passes through the aperture 15. The pesticide is delivered to the rollers or sponges from a reservoir. For example, the rollers or sponges may be partly immersed in a trough of other container to which a metered dose of pesticide is delivered from the reservoir.

The reservoir 16 may be a permanent part of the device, being kept filled with pesticide from another source. Altrnatively, however, the reservoir may comprise a disposable bottle of pesticide which may be replaced on the device when required. For example, the bottle may have a rupturable seal at its end which may be engaged with a spiked end on the conduit 20. Although it will normally be convenient for the pesticide to be in the form of a liquid, any other flowable material may be suitable, such as a powder or gel. Also, of course, the system is not restricted to the application of pesticides, and may be used to dispense any other flowable material which it is wished to apply to the animal for any reason.

It will be appreciated that although the device may be supplied as a complete unit including the cat flap, the components of the dispensing device may be supplied separately for fitting to an existing cat flap. In this case, suitable attachment means are provided for mounting the parts of the switch device 26 and the nozzles 25 on the frame 10 and flap 13. For example the parts of the switch 26 may be mounted by an adhesive, such as a pressure-sensitive adhesive, and the nozzles 25 may also be mounted on the frame 10 by adhesive patches or suitable brackets (not shown).

Although operation of the switch 26 by movement of the flap 13 provides a simple and reliable means of operation, the pump 19 may be activated by other types of switching means. For example, a switch controlling the pump 19 may be activated by the body of the animal interrupting a light beam extending across the aperture 15, or a switch may be incorporatd on a pressure pad on which the weight of the animal will bear at some stage as it passes through the cat flap.

In the case where flowable material is delivered by gravity or from a pressurised reservoir to nozzles adjacent the cat flap, the valve controlling the flow of material may be a mechanical valve which is mechanically operated by a linkage connected to the flap 13 so as to be automatically operated upon opening of the flap 13.

While this invention has been described with reference to illustrative embodiments, this description is not intended to be construed in a limiting sense. Various modifications and combinations of the illustrative embodiments as well as other embodiments of the invention will be apparent to person skilled in the art upon reference to this description. It is therefore contemplated that the appended claims will cover any such modifications, embodiments as fall within the true scope of the invention.

The inventor claims:

1. An automatic pet animal spraying system comprising:
   a) a fixed frame structure defining an access aperture;
   b) a displaceable cover pivotally mounted on said frame structure so as to extend across and cover the aperture when in a closed position the cover being pivotable from the closed position to the respective open positions on opposite sides of said fixed structure, the cover being moveable to one of said open positions in response to pressure on said cover from either side thereof so that a pet animal may pass through in either direction through said aperture;
   c) a dispensing device located adjacent to the frame structure for applying a flowable material to the body of a pet animal passing through the aperture; and
   d) a control means for activating said dispensing device in response to the passage of an animal through the aperture.

2. The automatic pet animal spraying system of claim 1 wherein said dispensing device includes an applicator for applying the flowable material to the body of a pet animal passing through the aperture and a supply means for delivering flowable material to the applicator under the control of said control means.

3. The automatic pet animal spraying system of claim 2 wherein said applicator comprises at least one spray nozzle located adjacent to the periphery of the aperture and directed inwardly thereof and said supply means is adapted to supply said flowable material under pressure to said nozzle.

4. The automatic pet animal spraying system of claim 3, wherein are provided two or more applicators being connected to a common supply of said flowable material.

5. The automatic pet animal spraying system of claim 4 wherein said supply means comprises a reservoir of said flowable material and wherein said control means controls the flow of said flowable material from said reservoir to said applicator.

6. The automatic pet animal spraying system of claim 5, wherein said control means includes a pump for delivering said flowable material from said reservoir to said applicator.

7. The automatic pet animal spraying system of claim 6 wherein said control means includes a valve.

8. The automatic pet animal spraying system of claim 7 wherein said reservoir includes an indicator to indicate the level of the flowable material in the reservoir.

9. The automatic pet animal spraying system of claim 5 wherein said supply means comprises a source of flowable material under pressure and said control means comprises a control valve between said source and said applicator and wherein said valve is opened in response to the passage of a pet animal through the aperture.

10. An animal spraying system comprising:
    a) a fixed frame structure defining an access aperture;
    b) a displaceable cover pivotally mounted on said frame structure so as to extend across and cover the aperture when in a closed position the cover being pivotable from the closed position to the respective open positions on opposite sides of said fixed structure, the cover being moveable to one of said open positions in response to pressure on said cover from either side thereof so that a pet animal may pass through in either direction through said aperture;
    c) a dispensing means located adjacent to the frame structure for applying a flowable material to the body of a pet animal passing through the aperture;
    d) a control means for activating said dispensing device in response to the passage of an animal through the aperture;
    e) a reservoir for flowable material connected to said dispensing means and mounted above said dispensing means
    f) at least one spray nozzle mounted on said frame structure and connected to said reservoir via at least one conduit;
    g) an electrically powered pump for delivering flowable material from said reservoir along said conduit to said nozzle; and
    h) an electric switch means which is operable to activate said pump.

11. The animal spraying system of claim 10 wherein said dispensing means is electrically operated and said control means includes an electric operating switch which is operated by passage of an animal through the aperture.

12. The animal spraying system of claim 11 wherein said electric operating switch is part of a circuit which includes a main electric switch such that the operating switch is only effective to actuate the dispensing means when said main switch has also been operated.

13. The animal spraying system of claim 11 wherein said electric operating switch is part of a circuit which also includes a time controlled switching device such that the operating switch is only effective to actuate said dispensing means when said time controlled switching device has also been operated.

14. The animal spraying system of claim 10 wherein said control means includes a switch device which is operated by movement of said displaceable cover from the closed position towards the open position.

15. The animal spraying system of claim 14 wherein said switch device is operated by movement of said displaceable cover in only one direction from the closed position.

16. The animal spraying system of claim 14 wherein said dispensing means is electrically operated and said switch device comprises an electric switch which is operated by movement of said displaceable cover from closed position towards the open position, such that the closure of said switch activates the dispensing means.

17. The animal spraying system of claim 16 which includes a battery box whereby batteries located in the box provide electrical poser to said pump under the control of said switch means.

18. A pet spraying method comprising the steps of:
 a) erecting a frame structure having an access door operable in either direction;
 b) mounting a reservoir filled with a flowable material;
 c) mounting a spray means on said frame;
 d) connecting said spray means to said reservoir with said flowable material via at least one conduit;
 e) providing at least one control means for controlling flow of said flowable material to said spray means;
 f) providing a means for detecting the presence of a pet animal through said access door; and
 g) activating said control means and thereby said spray means when the presence of a pet is detected through said access door.

* * * * *